US011655023B2

(12) United States Patent
Singh et al.

(10) Patent No.: US 11,655,023 B2
(45) Date of Patent: May 23, 2023

(54) FIXED-WING VERTICAL TAKE-OFF AND LANDING HYBRID UAV (71) Applicant: ideaForge Technology Pvt. Ltd., Navi Mumbai (IN)

(72) Inventors: Rahul Singh, Navi Mumbai (IN); Ashish Bhat, Navi Mumbai (IN); Vishal Khetmali, Navi Mumbai (IN); Gulab Mali, Navi Mumbai (IN)

(73) Assignee: ideaForge Technology Pvt. Ltd., Navi Mumbai (IN)

( * ) Notice: Subject to any disclaimer, the term of this patent is extended or adjusted under 35 U.S.C. 154(b) by 419 days.

(21) Appl. No.: 16/962,161

(22) PCT Filed: Jan. 15, 2019

(86) PCT No.: PCT/IB2019/050296
§ 371 (c)(1),
(2) Date: Jul. 14, 2020

(87) PCT Pub. No.: WO2019/150206
PCT Pub. Date: Aug. 8, 2019

(65) Prior Publication Data
US 2020/0398983 A1 Dec. 24, 2020

(30) Foreign Application Priority Data

Jan. 30, 2018 (IN) .............................. 201821003494

(51) Int. Cl.
*B64C 29/00* (2006.01)
*B64C 37/00* (2006.01)
(Continued)

(52) U.S. Cl.
CPC .......... *B64C 29/0033* (2013.01); *B64C 37/00* (2013.01); *B64C 39/024* (2013.01);
(Continued)

(58) Field of Classification Search
CPC .... A63H 27/00; A63H 11/06; B64C 29/0033; B64C 37/00; B64C 39/024; B64C 2201/021; B64C 2201/104; B64C 25/06
See application file for complete search history.

(56) References Cited

U.S. PATENT DOCUMENTS 3,735,524 A * 5/1973 Staats .................... A63H 27/00
446/34
5,979,824 A * 11/1999 Gagliano .................. B64C 1/26
244/45 R
9,120,560 B1 1/2015 Armer et al.
(Continued)

FOREIGN PATENT DOCUMENTS

GB 2550489 A 11/2017
KR 20170072069 A * 6/2017
(Continued)

OTHER PUBLICATIONS

PCT International Search Report and Written Opinion for International Application No. PCT/IB2019/050296, entitled "Fixed-Wing Vertical Take-Off and Landing Hybrid UAV," dated Dec. 4, 2019.
(Continued)

*Primary Examiner* — Assres H Woldemaryam
*Assistant Examiner* — Anna L. Gordon
(74) *Attorney, Agent, or Firm* — Hamilton, Brook, Smith & Reynolds, P.C.

(57) ABSTRACT

A fixed-wing VTOL hybrid UAV is disclosed comprising: a central frame 104; a pair of quick lockable fixed-wings 102 comprising right wing 102-2 and left wing 102-1 that lock with each other over the central frame; and four electrically operated rotors 108 in downward facing configuration attached to fixed-wings with help of rotor-blade arms 110. Arms 110 are pivotally fixed to wings 102 so that arms 110 are movable between a working position in which arms 110 are oriented parallel to central frame 104, and a storage
(Continued)

position in which arms 110 are aligned with wings 102. Central frame 104 is a thin rod and works as fuselage. Drivers and control modules are fitted in wings 102. UAV includes rudders attached to arms at 45 degrees for maneuvering UAV for yaw and a secondary roll response. UAV includes two landing gears 106 attached to each end of central frame.

12 Claims, 6 Drawing Sheets

(51) Int. Cl.
*B64C 39/02* (2023.01)
*B64C 39/04* (2006.01)
*B64U 10/25* (2023.01)
*B64U 30/10* (2023.01)
*B64U 30/20* (2023.01)

(52) U.S. Cl.
CPC .............. *B64C 39/04* (2013.01); *B64U 10/25* (2023.01); *B64U 30/10* (2023.01); *B64U 30/20* (2023.01)

(56) References Cited

U.S. PATENT DOCUMENTS

| | | | |
|---|---|---|---|
| 2012/0091257 A1* | 4/2012 | Wolff | B64C 29/0033 244/12.4 |
| 2015/0136897 A1 | 5/2015 | Seibel et al. | |
| 2015/0344134 A1* | 12/2015 | Cruz Ayoroa | B64C 39/024 244/48 |
| 2018/0186448 A1* | 7/2018 | Pantalone | B64C 39/024 |
| 2019/0033932 A1* | 1/2019 | Ku | B64D 13/006 |
| 2019/0100313 A1* | 4/2019 | Campbell | B64D 1/02 |

FOREIGN PATENT DOCUMENTS

| | | | |
|---|---|---|---|
| WO | WO-9606005 A1 * | 2/1996 | A63H 27/12 |
| WO | WO-2012141736 A1 * | 10/2012 | B64C 27/28 |
| WO | 2017025060 A1 | 2/2017 | |
| WO | WO-2017107753 A1 * | 6/2017 | |
| WO | WO-2017200610 A1 * | 11/2017 | B64C 15/02 |

OTHER PUBLICATIONS

PCT International Preliminary Report on Patentability for International Application No. PCT/IB2019/050296, entitled "Fixed-Wing Vertical Take-Off and Landing Hybrid UAV," dated Aug. 4, 2020.

* cited by examiner

FIXED-WING VERTICAL TAKE-OFF AND LANDING HYBRID UAV

This application is the U.S. National Stage of International Application No. PCT/IB2019/050296, filed Jan. 15, 2019, which designates the U.S., published in English, and claims priority under 35 U.S.C. § 119 or 365(c) to Indian Application No. 201821003494, filed Jan. 30, 2018. The entire teachings of the above applications are incorporated herein by reference.

TECHNICAL FIELD

The present disclosure relates generally to the field Unmanned Aerial Vehicles (UAV). In particular it pertains to a fixed-wing Vertical Take-off and Landing (VTOL) hybrid UAV.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Hybrid quad rotor technology offers an innovative and logistically simple solution to problem of vertical take-off and landing (VTOL) by combining the vertical take-off and landing capabilities of a quad rotor, and efficiency, speed, and range of a normal fixed-wing aircraft. Thus, a hybrid UAV can take-off and land vertically like helicopter UAVs, and transit to cruise flight like airplanes.

A Typical fixed-wing VTOL UAV consists of rotor-blade arms along with fixed wings; and their integration in a single Aerial Vehicle. Besides offering performance advantage of working like a fixed-wing aircraft with vertical take-off and landing performance, they offer other advantages as well like no landing place restrictions, and that of long-range and high-speed characteristics.

Many fixed-wing VTOL hybrid UAV with different structures and capabilities are known in the related art. For example United States Patent Application Number US20150136897A1 discloses an Unmanned Aerial System comprising a rigid wing, which enables aerodynamic horizontal flight, and at least four rotors which are driven by means of controllable electric motors and which can be pivoted between a vertical starting position and a horizontal flight position by means of a pivoting mechanism, wherein all electric motors and rotors are arranged on the wing.

However, such electric fixed-wing VTOL hybrids UAVs are associated with problems like lower endurance, range, and difficulty in packaging and transportation.

There is, therefore, a need in the art to provide an efficient fixed-wing VTOL UAV that has better endurance, range and that can be easily packed and transported and deployed quickly.

OBJECTS OF THE INVENTION

A general object of the present disclosure is to provide an improved and efficient fixed-wing VTOL UAV.

An object of the present disclosure is to provide a fixed-wing VTOL UAV that has a better structure and system design as compared to conventional fixed-wing VTOL UAVs.

Another object of the present disclosure is to provide a fixed-wing VTOL UAV that has longer endurance, longer range, and is compact.

Another object of the present disclosure is to provide a fixed-wing VTOL UAV system with simple packaging for easy transportation.

Yet another object of the present disclosure is to provide a fixed-wing VTOL UAV system with lower assembly steps for rapid deployment.

These and other objects of the present invention will become readily apparent from the following detailed description taken in conjunction with the accompanying drawings.

SUMMARY

Aspects of the present disclosure relate to a fixed-wing Aerial Vehicle with capability for Vertical Take-off and landing (VTOL) that incorporates a better structure and system design as compared to conventional fixed-wing VTOL UAVs to result in improved endurance and longer range. In addition, the structure of the disclosed fixed-wing VTOL UAV results in compact packaging with corresponding ease of transportation and reduced assembly time for quick deployment.

In an aspect, the disclosed fixed-wing VTOL hybrid UAV (also referred to as fixed-wing VTOL UAV or simply as hybrid UAV and the terms used interchangeably hereinafter) comprises a central frame/fuselage; a pair of quick lockable fixed-wings (also referred simply as wings) comprising right wing and left wing that lock with each other over the central frame/fuselage; and at least four electric motors with downward facing configuration attached to the pair of wings with help of rotor-blade arms (also referred to simply as arm/arms). In an aspect, the rotor-blade arms that hold the at least four electric motors are pivotally fixed to the pair of wings so that the arms are movable between a working position in which they are oriented along longitudinal axis of the central frame i.e. parallel to the fuselage, and a storage position in which they are aligned with the wings.

In an aspect, the disclosed Hybrid UAV further includes means to lock pivotable rotor-blade arms in their working position, and the means are removable locking mechanism that can be removed when the arms are to be moved to storage position from the working position.

In an aspect, central frame/fuselage is a thin rod which reduces drag and improves efficiency of the disclosed hybrid UAV. Control modules/drivers of the disclosed hybrid UAV are all fitted into wings, and payload can be attached to the thin rod.

In an aspect, downward facing configuration of at least four electric motors provides aerodynamically efficient arrangement with no prop wash interference and very little intake interference. This significantly improves VTOL efficiency and lift capability.

In an aspect, at least four electric motors that are arranged in H-configuration can have clockwise rotation of front left rotor and counter-clockwise rotation of front right rotor. In an aspect, the chosen rotational directions for the rotors coupled with H configuration of rotors results in an improved yaw performance by adding twisting tendency of the arms to yaw input that is provided as torque change.

In an aspect, the disclosed UAV further includes rudders attached to the rotor-blade arms and inclined at 45 degrees inwardly toward each other, wherein the rudders function as a twin boom tail stabilizer, said twin boom tail stabilizer characterized by absence of a horizontal stabilizer.

In an aspect, the rudders include ruddervators for maneuvering the UAV for yaw and a secondary roll response. In another aspect, the proposed configuration of rudders provides proverse roll response in the yaw direction and help maneuvering the disclosed UAV for yaw and a secondary roll response. This improves efficiency of the UAV in making banked turns with better flexibility.

In an aspect, the disclosed hybrid UAV further includes a set of landing gears comprising at least two landing gears. The at least two landing gears are attached to each end of central frame/fuselage, and are designed to balance weight of the UAV while taking-off and landing. Each of the at least two landing gears comprises: a landing gear mount fixed to the central frame; a right landing gear; and a left landing gear. The landing gear mount is permanently fixed to the central frame and incorporates snap-fit locking mechanism to receive the left landing gear and the right landing gear.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments of the present disclosure relate to a fixed-wing VTOL hybrid Aerial Vehicle incorporating an improved structure and system design as compared to conventional fixed-wing VTOL UAVs that results in improved endurance and longer range. The proposed structure of the fixed-wing VTOL UAV also results in reduced weight and enables compact packaging with corresponding ease of transportation and reduced assembly time for quick deployment.

In an aspect, the disclosed fixed-wing VTOL hybrid UAV comprises a pair of quick lockable fixed-wings comprising a left fixed-wing and a right fixed-wing, which lock with each other over a central frame; an easy locking central landing gear; at least four electric motors with downward facing configuration attached to the fixed-wings with the help of a pair of arms; and a set of rudders/tail fins configured with the pair of arms, and arranged at 45 degrees.

In an aspect, the arms are pivot able on fixed-wings to move between a working position in which they are disposed parallel to central frame/fuselage (i.e. perpendicular to the fixed-wing); and a storage/stowing position in which they are disposed along the fixed-wings thereby resulting in reduced space requirement for packaging the fixed-wing and the arms without having to completely detach them from each other.

In an aspect, central frame/fuselage is a thin rod which reduces the drag and improves efficiency of the disclosed hybrid UAV. Control modules/drivers of the disclosed hybrid UAV are all fitted into wings, and payload can be attached to the thin rod such as at front end of the fuselage.

In an aspect, pair of arms in their working position provide an H-configuration to four motors/rotors that are attached to ends of each arm of the pair of arms. The rotors in H configuration can have clockwise rotation for front left rotor and counter-clockwise rotation for front right rotor. In an aspect, the chosen rotational directions for the rotors coupled with H configuration of rotors results in an improved yaw performance by adding twisting tendency of the arms to yaw input that is provided as torque change.

In an aspect, four motors/rotors attached to ends of each arm of the pair of arms are in downward facing configuration, which provides an aerodynamically efficient arrangement with no prop wash interference and very little intake interference. This significantly improves VTOL efficiency and lift capability.

In an aspect, the disclosed UAV further includes rudders attached to the rotor-blade arms at 45 degrees, wherein the rudders function as a twin boom tail stabilizer, said twin boom tail stabilizer characterized by absence of a horizontal stabilizer.

In an aspect, the rudders include ruddervators for maneuvering the UAV for yaw and a secondary roll response. In another aspect, the inverted V-tail configuration of rudders provides proverse roll response in the yaw direction and help maneuvering the disclosed UAV for yaw and a secondary roll response. This improves efficiency of the UAV in making banked turns with better flexibility.

In an aspect, the disclosed hybrid UAV further includes a set of at least two landing gears that are attached to each end of central frame/fuselage. The landing gears are designed to balance weight of the UAV while taking-off and landing. Each landing gear comprises a right landing gear and a left landing gear that are designed for quick assembly/disassembly with/from the UAV by means of landing gear mounts. The landing gear mount is permanently fixed to the central frame and incorporates snap-fit locking mechanism to receive the left landing gear and the right landing gear.

Figure 1:
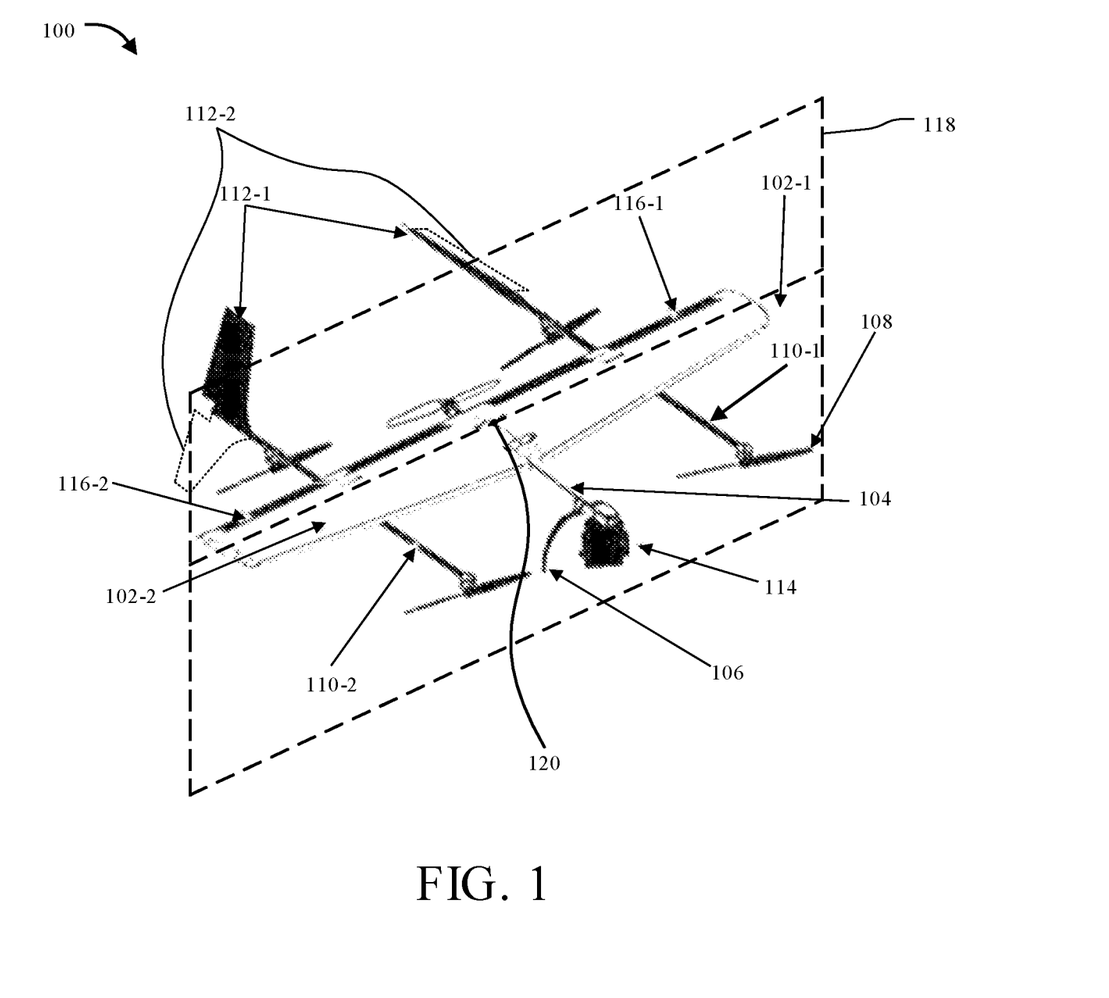
FIG. 1 illustrates an exemplary perspective view of the proposed fixed-wing vertical take-off and landing hybrid UAV in accordance with embodiments of the present disclosure.

Referring now to FIG. 1 where an exemplary perspective view of the proposed fixed-wing vertical take-off and landing hybrid UAV is disclosed, the proposed hybrid UAV 100 comprises a pair of quick lockable fixed-wings comprising a left fixed-wing 102-1 and a right fixed-wing 102-2 (collectively referred to as fixed-wings 102 or simply as wings-102), which lock with each other over a central frame 104; a set of easy locking central landing gear 106; at least four electric motors/rotors 108 with downward facing configuration attached to the fixed-wings 102 with the help of a pair of rotor-blade arms 110-1 and 110-2; and a set of rudders/tail fins, such as rudders/tail fins 112-1 and 112-2 (collectively referred to as rudders/tail fins 112, herein) configured with the pair of rotor-blade arms 110.

In an aspect, central frame/fuselage 104 can be a thin rod which reduces drag as well as weight, and thereby improves efficiency of the disclosed hybrid UAV 100. Control modules/drivers of the disclosed hybrid UAV can all be fitted into wings 102, and payload such as payload 114 can be attached to the central frame/fuselage 104 at its front end as shown in FIG. 1. The wings 102 can also incorporate ailerons 116-1 and 116-2 for navigation of the UAV 100.

In an aspect, the disclosed hybrid UAV 100 further includes a set of at least two landing gears 106 that are attached to central frame/fuselage 104 at locations designed to balance weight of the UAV 100 while taking-off and landing.

FIG. 1 also shows rudder/tail fins 112 (also known in the related art as "empennage" and "stabilizer." The preferred term is "stabilizer," because it is at least partially descriptive of the component's function) arranged at rear ends of arms 110. The stabilizer/tail of an airplane is designed to provide both stability and control of the airplane in pitch and yaw. There are different forms an aircraft tail can take to meet the dual requirement of stability and control. Most tail designs have a horizontal wing like structure generally identified as horizontal stabilizers, and one or more vertical or near-vertical structures generally identified as vertical stabilizers.

Other types of airplane tail design include, but are by no means limited to, the conventional, T-tail, cruciform-tail, dual-tail, triple-tail, V-tail, inverted V-tail, inverted Y-tail, twin-tail, boom-tail, high boom-tail, and multiple-plane tail designs.

A dual tail is a specific type of vertical stabilizer arrangement found on the empennage of some aircraft, and having two vertical stabilizers, often smaller on their own than a single conventional tail would be, mounted at the outside of the aircraft's horizontal stabilizer. A special case of dual tail is a boom tail (or twin boom tail) where the aft airframe consists of two separate fuselages, each having a rudder, and usually connected by a single horizontal stabilizer. However, the horizontal stabilizer adds weight to the structure.

Twin boom tails are usually preferred in aircrafts which have complex design arrangement like twin motors, twin fuselages, single pusher propulsion units etc. In aircrafts with single pusher propulsion unit mounted on the trailing side of the aircraft body, where arrangement of tails becomes complex in order to provide a clean air flow to the propulsion unit, making the twin boom tails a preferred arrangement.

In twin boom tails, if the distance between the left and the right boom is not significant then the yaw control does not have significant effect on the roll because of the tail geometry.

Previously, UAVs have been provided with combined inverted V-tail with twin boom aircraft design. But such tail designs provide minimal yaw to roll coupling as this arrangement with a pair of tail-booms connected with fin-stabilizers joining at the centre directly or with a horizontal stabilizer limits the span between the twin booms, in turn becoming a design limitation.

In an aspect of the present disclosure, rudders are attached to the twin-boom at 45 degrees inwardly above centre axis of the twin-boom eliminating a horizontal stabilizer thereby achieving proverse roll and not limiting the span between the twin booms for design flexibility. The vertical stabilizers/rudders/tail fins 112 are configured with the pair of rotor-blade arms 110 that act as twin boom of the UAV above their centre axis, and are inclined at 45 degrees inwardly towards each other. The vertical stabilizer/rudders 112 also comprise ruddervators with servos for easy control of pitch and yaw. The disclosed arrangement eliminates horizontal stabilizers providing the same benefit as a combined inverted "V" tail with a twin boom without limitation of increasing span between the twin boom.

As known in the art, maneuvering a UAV such as by rudder/tail fin rudder/tail fins 112, results in yaw and a secondary roll response. The produced roll response is either adverse or proverse according to different rudder angles. In the proposed hybrid UAV system, the arrangement of the rudder/tail fin is inclined at 45 degrees inwardly, as shown by reference numeral 112-1, towards each other, which provides proverse roll response in yaw direction which improves efficiency of the UAV in making banked turns with better flexibility.

In an alternate embodiment, the same benefit of the present invention can be obtained when the rudders 112 configured with the rotor-blade arms 110 are at 45 degrees inclined outwards, as shown by reference numeral 112-2, from each other, but below the centre axis of the rotor-blade arms 110.

Figure 2:
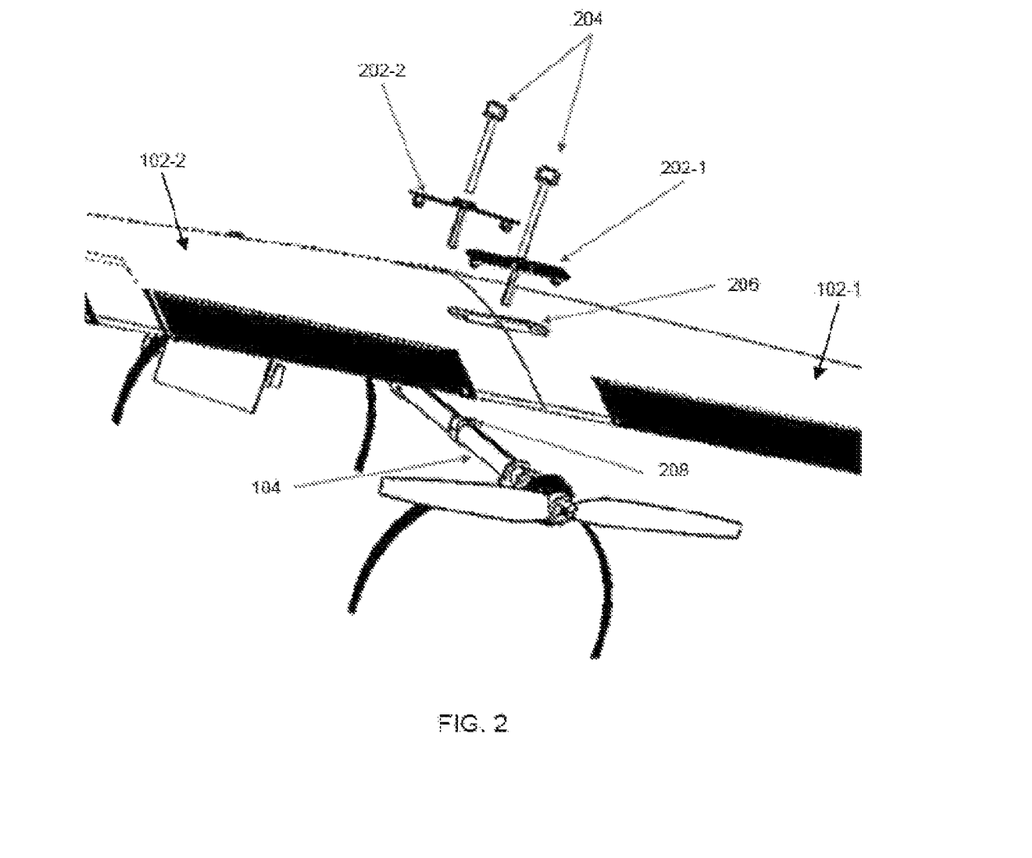
FIG. 2 illustrates an exemplary exploded view showing locking of pair of quick lockable fixed-wings with each other over the central frame/fuselage in accordance with an embodiment of the present disclosure.

FIG. 2 illustrates an exemplary exploded view showing locking of pair of quick lockable fixed-wings 102 with each other over the central frame/fuselage 104 in accordance with an embodiment of the present disclosure. As stated earlier, the fixed-wings 102 comprises a left fixed-wing 102-1 and a right fixed-wing 102-2, each of which is tapered straight wing, and the two wings 102-1 and 102-2 lock with each other over central frame 104 eliminating any necessity of a bigger fuselage as the control modules are integrated with in the two wings 102. This reduces body weight of the UAV 100 and also reduces drag produced by heavier fuselage and improves efficiency.

As shown in FIG. 2, two wings 102-1 and 102-2 are locked together and fixed to central frame 104 using two wing retainers 202 and two bolts 204. The wings 102 incorporate cavities 206 that accommodate the wing retainers 202, and additionally incorporate through holes for the bolts 204 to pass through. The bolts engage in corresponding threaded bosses 208 provided on the central frame 104 at corresponding locations. The holes on the fixed-wings 102 and the threaded boss 208 of the central frames 104 are aligned such that two wing retainers 202 hold the two wings 102 together and the two bolts 204 hold the assembly of wings 102 and wing retainers 202 with the central frame 104 rigidly.

In an aspect, the arms 110 are pivot able on fixed-wings 102 to move between a working position in which are disposed parallel to central frame/fuselage 104 (i.e. perpendicular to the fixed-wing 102); and a storage/stowing position in which they are disposed along the fixed-wings 102 thereby resulting in reduced space requirement for packaging the fixed-wing 102 and the arm 110 without having to completely detach them from each other. Besides reducing storage space requirement, the configuration also helps in quick deployment of the UAV 100 as arms just need to be rotated to the working position and locked in that position.

Figure 3:
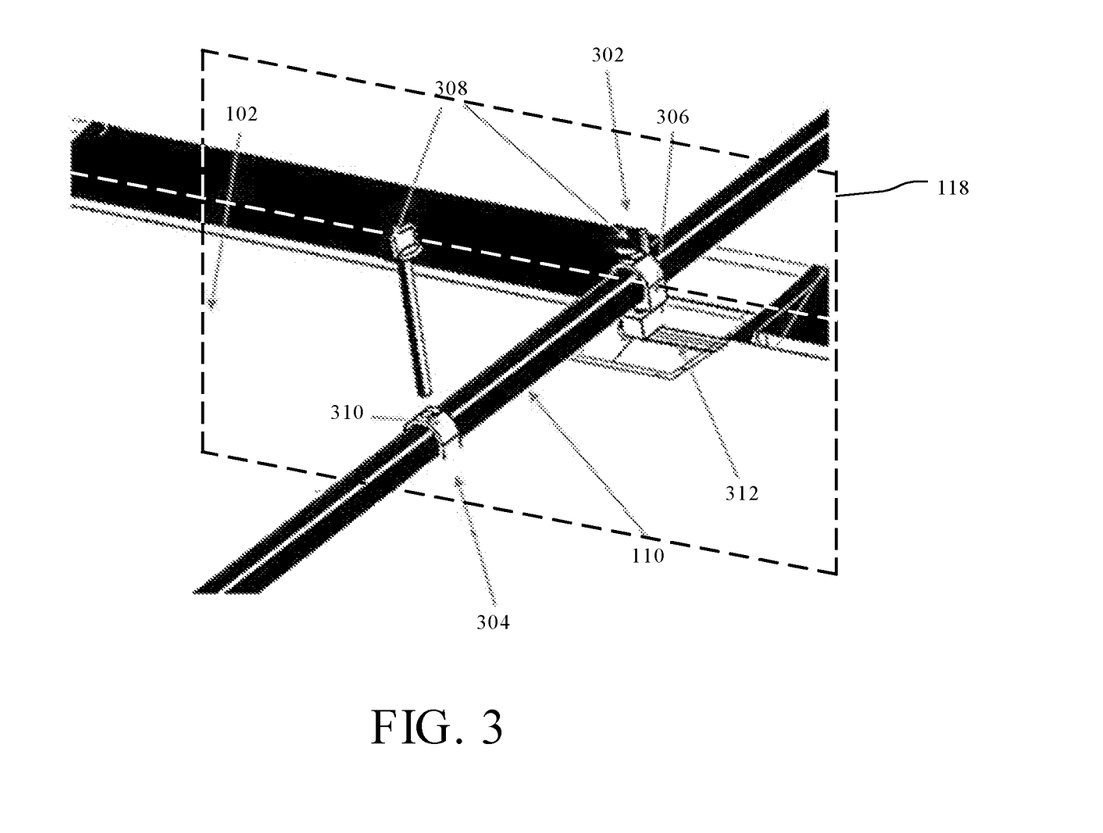
FIG. 3 illustrates an exemplary schematic arrangement showing arrangement of pivot able arm on fixed-wing with removable locking arrangement in accordance with an embodiment of the present disclosure.

FIG. 3 illustrates an exemplary schematic arrangement showing arrangement of pivot able arm 110 on fixed-wing 102 with removable locking arrangement in accordance with an embodiment of the present disclosure. As shown, the arms 110 can be fixed to fixed-wing using a locking mechanism provided at base of the fixed-wing 102. The locking mechanism comprises a permanently fixed pivot able lock 302 and a removable locking mechanism 304. The permanently fixed pivot able lock 302 provides a rotational axis that lies perpendicular to the fixed-wing 102 for movement/rotation of the arm 110 relative to the fixed-wing between storage position and working position. It consists of a first threaded boss 306 affixed to the fixed-wing 102 at a position that lies in a vertical transverse plane 118 passing through center of gravity CG) 120 of the UAV 100. The arm 110 incorporates a hole at CG of the arm 110. Thus, when the arm 110 is assembled to the fixed-wing 102 of the UAV 100, its CG matches with CG of the UAV 100. A bolt 308 and a lock nut (not shown here) are used to fix the arm 110 to the first threaded boss 306 in pivotable manner to allow rotation of the arm 110 from 0-90 degrees.

Removable locking mechanism between the rotor-blade arm and the fixed wing consists of a second threaded boss 310 affixed to the fixed-wing 102 at a point that is longitudinally aligned with the first threaded boss 306. A hole is provided on the arm 110 in a matching position for a bolt 308 to pass through. For fixing the arm in working position, the arm can be appropriately aligned by rotation about the permanently fixed pivotable lock 302 so that hole in the arm 110 aligns with the second threaded boss 310 and the bolt 308 can be used to fix the arm 110 in working position for flight.

In an aspect, arms 110 can also carry rotor wires 312 (as shown in FIG. 3) from rotors to fixed wing 102 where they get connected with the driver in the fixed-wing 102. The connecting wires of the rotors from the two ends of the arms 110 run along interior of hollow arms 110 and get connected to the driver within the fixed wing. This connection is carried out with the help of belt wires which eliminate need of male and female connectors. This reduces weight of connectors contributing to reduced UAV weight and better efficiency besides making the system compact leading to rapid deployment, compact packaging and easy transport. The wires are connected in such a way that it is ensured that they do not get entangled during pivoting of the arm.

Figure 4A:
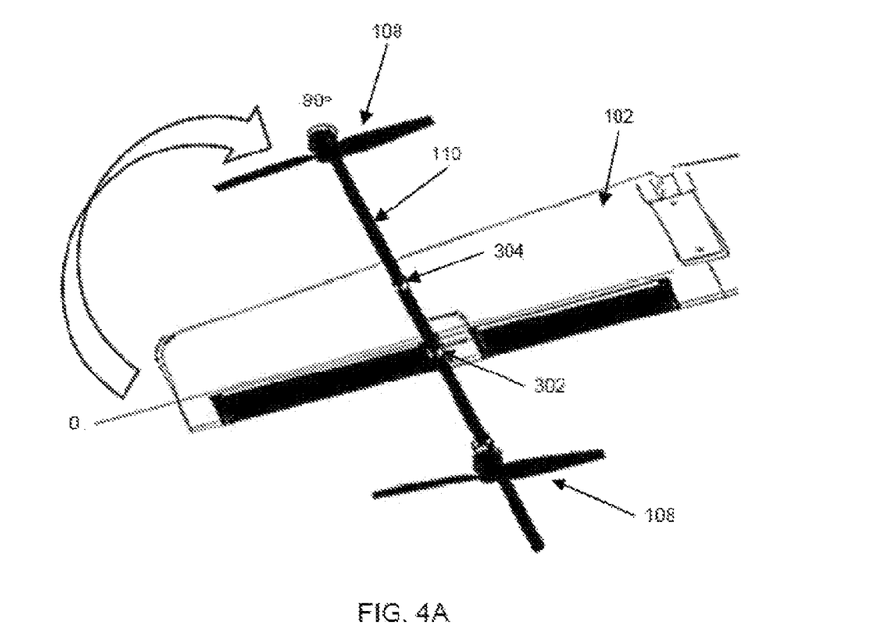
FIGS. 4A and 4B illustrate exemplary views showing working position and storage position respectively of an arm in accordance with an embodiment of the present disclosure.
Figure 4B:
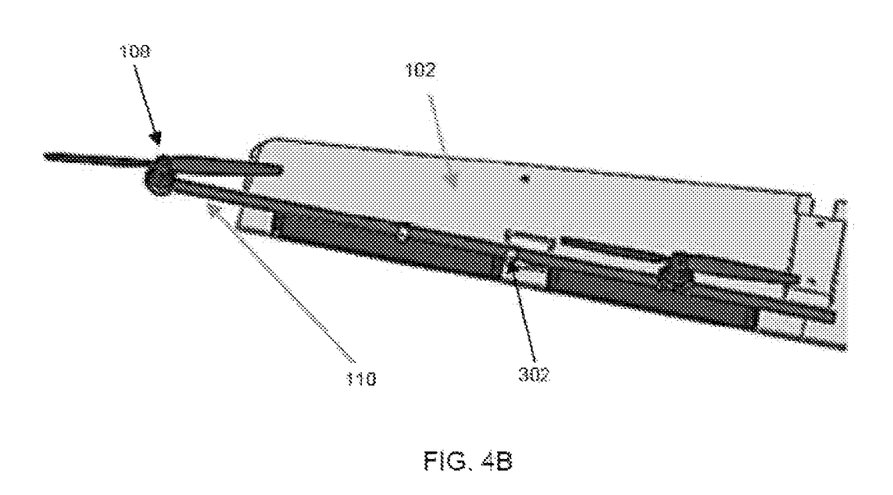

FIGS. 4A and 4B illustrate exemplary views showing working position and storage/stowage position respectively of an arm in accordance with an embodiment of the present disclosure. FIG. 4B shows one of the fixed-wings 102 with arm 110 in its initial state/packaged state/storage position before assembly for flight. The arm 110 in this condition has two rotors 108 with rotor blades attached to its two ends, and lies almost parallel to the fixed-wing 102. The arm 110 can be moved to working position during assembly of the UAV 100 by rotating it 90 degrees about permanently fixed pivotable lock 302, and locking using removable locking mechanism 304, in a position that is perpendicular to the fixed-wing 102 as shown in FIG. 4A.

Figure 5A:
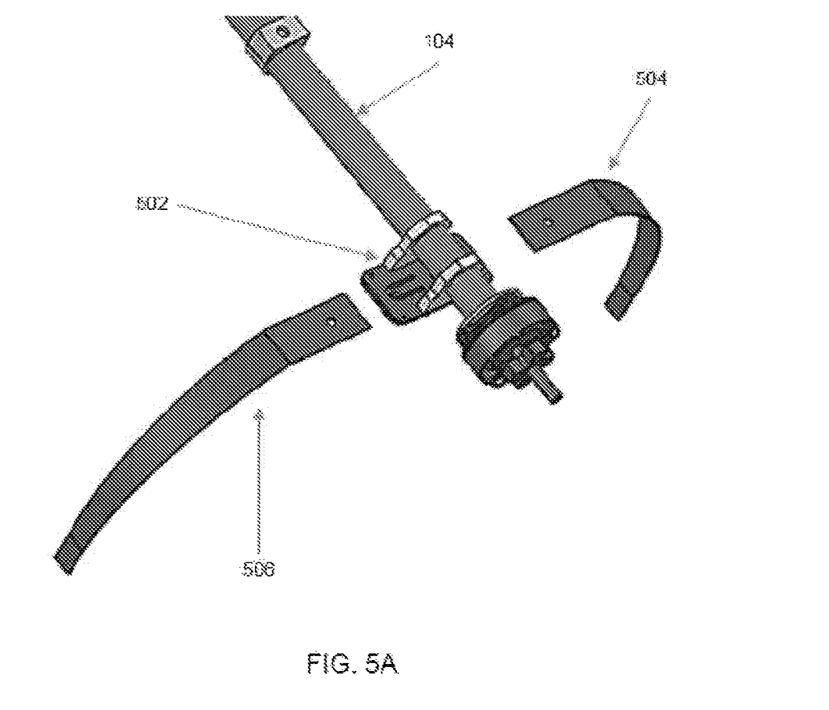
FIGS. 5A and 5B illustrate exemplary views showing fitment of landing gear to central frame in accordance with an embodiment of the present disclosure.
Figure 5B:
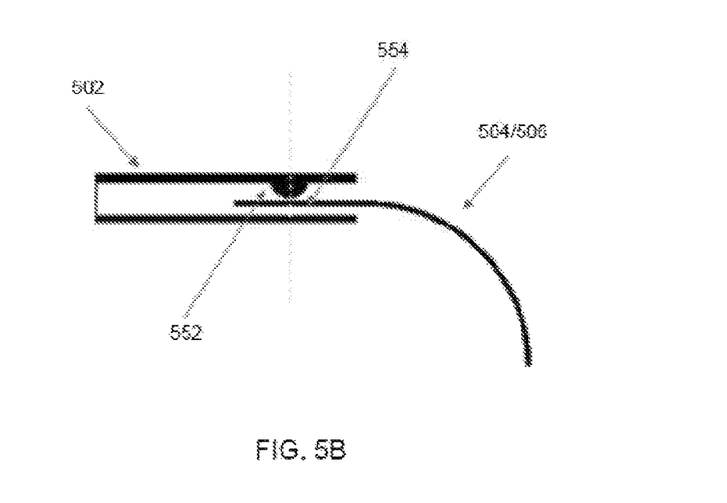

FIGS. 5A and 5B illustrate exemplary views showing fitment of landing gear to central frame 104 in accordance with an embodiment of the present disclosure. In an aspect, landing gears incorporate easy snap-fit locking mechanism for easy and quick disassembly/assembly of the landing gear. There can be two landing gears attached to central frame 104 that is a thin rod acting as fuselage, at its two ends and designed such that they balance weight of the UAV 100 during take-off and landing.

As shown in FIG. 5A, each landing gear can consist of three parts; landing gear mount 502 that is fixed to central frame 104; a right landing gear 504; and a left landing gear 506. The landing gear mount 502 is permanently fixed to the central frame 104 and the right landing gear 504 and left landing gear 506 can have a snap-fit locking mechanism for fitment with the landing gear mount 502.

FIG. 5B depicts apart side view of a landing gear showing details of snap-fit locking mechanism of the landing gears. The landing gear mount 502 can have a slot for insertion of right/left landing gears 504/506, and a small semi-circular ball 552 can protrude out towards the slot. The right/left landing gears 504/506 and opposite side of the landing gear mount 502 has a hole 554 with which the semi-circular ball 552 can engage in snap-fit manner when the right/left landing gears 504/506 are inserted in the slot to keep them in position. As can be appreciated, the proposed landing gear arrangement is very helpful in packaging as it helps in assembling & disassembling the landing gear within seconds.

Figure 6:
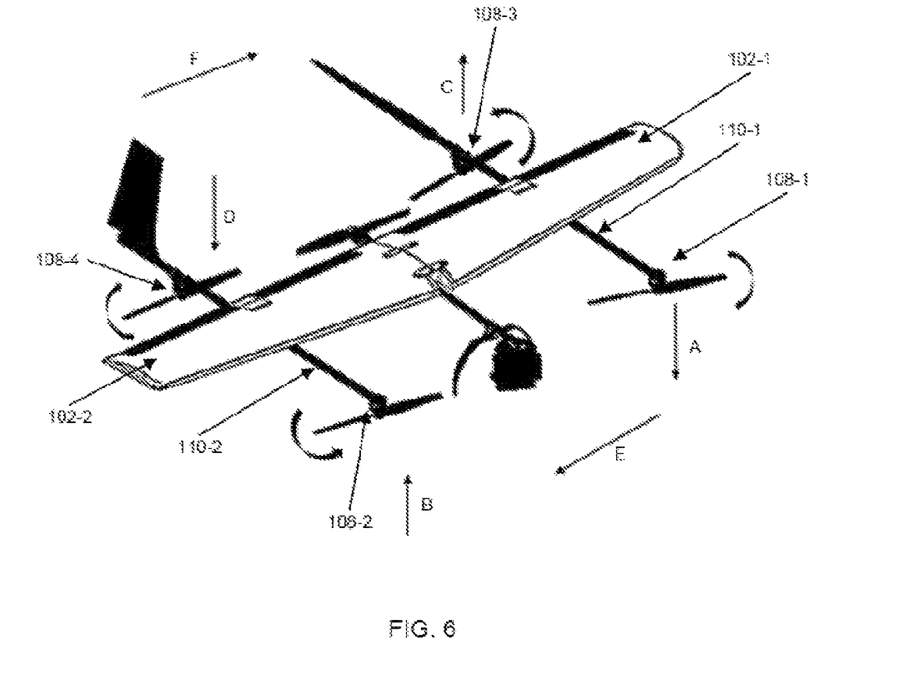
FIG. 6 illustrates an exemplary representation of working of four rotors in H configuration to achieve an improved yaw performance by adding twisting tendency of the arms to yaw input in accordance with an embodiment of the present disclosure.

FIG. 6 illustrates an exemplary representation of working of four rotors in H configuration to achieve an improved yaw performance by adding twisting tendency of the arms to yaw input in accordance with an embodiment of the present disclosure. As can be seen, pivotable arms 110 that hold at least four motors/rotors 108 at their ends provide an H-configuration to four motors/rotors 108-1. 108-2, 108-3 and 108-4 (collectively 108) in their working position. The H-configuration has advantage of a somewhat flexible frame which has ability to provide improved yaw response when compared to a conventional 'X' frame design. The H-configuration provides flexibility that allows some twisting of the front arm relative to the back arm through the centre and so the rotor blade direction choices result is important for improved yaw performance over other frame configurations.

FIG. 6 shows a top-view of the disclosed hybrid UAV 100 with a clockwise yaw input with rotors 108 rotating in the shown directions for best yaw performance. When using torque change to give a clockwise yaw input to the UAV, the rotation of the front left rotor 108-1 can be chosen to be clockwise providing decreased lift as shown by arrow A, and the front right rotor 108-2 rotation direction is chosen to be counter-clockwise providing increased lift as shown by arrow B. Thus, the front left rotor 108-1 decreases lift and the front right rotor 108-2 increases lift. Similarly, the right rear rotor 108-4 decreases lift as shown by arrow D, and the left rear rotor 108-3 increases lift as shown by arrow C. These rotor lift changes result in torque changes that give clockwise yaw based on torque alone. At the same time, since the UAV configuration is an H-configuration and both the rotor arms are rigidly held, increasing the lift of the rotor 108-2 and decreasing the lift of rotor 108-4 twists the right fixed-wing 102-2 backward as a result of a net torque produced in the backward twisting direction. Similarly decreasing the lift of the rotor 108-1 and increasing the lift of rotor 108-2 twists the left fixed-wing 102-1 forward as a result of a net torque produced in the forward twisting direction. This results in front of the UAV 100 moving towards right as shown by arrow E, and rear of the UAV 100 moving towards left as shown by arrow F. This makes the machine spin about its centre in the same way as a clockwise yaw input.

On the contrary, if the rotor directions are to be reversed, the front rotors shall twist towards left and the rear rotors shall twist towards right and the resultant twist from the lift shall oppose the yaw input produced from torque balancing. This would reduce the performance of the yaw response. Therefore, a properly designed "H" frame with chosen direction of rotation for rotors 108 makes the best use of this concept, and results in an improved yaw performance over other quads and multi-rotors.

Thus, the present disclosure provides an improved and efficient fixed-wing VTOL UAV incorporating better structure and system design that results in longer endurance, longer range, and a compact packaging resulting in easy transportation and quick deployment.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides an improved and efficient fixed-wing VTOL UAV.

The present disclosure provides a fixed-wing VTOL UAV that has a better structure and system design as compared to conventional fixed-wing VTOL UAVs.

The present disclosure provides a fixed-wing VTOL UAV that has longer endurance, longer range, and is compact.

The present disclosure provides a fixed-wing VTOL UAV system with simple packaging for easy transportation.

The present disclosure provides a fixed-wing VTOL UAV system with lower assembly steps for rapid deployment.

We claim:

1. A fixed-wing vertical take-off and landing UAV, comprising:
    a central frame;
    a pair of quick lockable fixed-wings comprising right wing and left wing that lock with each other over the central frame; and
    at least four electrically operated rotors attached to the pair of quick lockable fixed-wings with help of a pair of rotor-blade arms;
wherein each of the rotor-blade arms holds at least two of the at least four electrically operated rotors and is pivotally fixed to the pair of quick lockable fixed-wings so that the rotor-blade arm is movable, about a single permanently fixed pivotable lock, between a working position in which the rotor-blade arm is oriented parallel to the central frame, and a storage position in which the rotor-blade arm, along with the at least two electrically operated rotors, is aligned with the quick lockable fixed-wings.

2. The UAV as claimed in claim 1, pivotally wherein the rotor-blade arms are locked in the respective working positions by respective removable locking mechanisms that are removed for moving the rotor-blade arms to the respective working positions.

3. The UAV as claimed in claim 1, wherein the permanently fixed pivotable locks are located in a vertical transverse plane passing through center of gravity of the UAV.

4. The UAV as claimed in claim 1, wherein the at least four electrically operated rotors are attached to the pair of quick lockable fixed-wings with help of the rotor-blade arms in downward facing configuration.

5. The UAV as claimed in claim 4, wherein the UAV includes four electrically operated rotors with two rotors attached to each of two rotor-blade arms forming an H configuration in working position of the two rotor-blade arms; and wherein a rotor located in front right position rotates in counter-clockwise direction, a rotor located in front left position rotates in clockwise direction, a rotor located in rear-right position rotates in clockwise direction, and a rotor located in rear-left position rotates in counter-clockwise direction, when viewed from top.

6. The UAV as claimed in claim 1, wherein the UAV further includes rudders with associated ruddervators for maneuvering the UAV for yaw and a secondary roll response.

7. The UAV as claimed in claim 6,
    wherein the rudders are attached to the rotor-blade arms at 45 degrees, said rudders functioning as a twin boom tail stabilizer, said twin boom tail stabilizer characterized by absence of a horizontal stabilizer.

8. The UAV as claimed in claim 7, wherein the rudders are attached to the rotor-blade arms above a centre axis of the rotor blade arms at 45 degrees inclined inwardly towards the fuselage.

9. The UAV as claimed in claim 7, wherein the rudders are attached to the rotor-blade arms below a centre axis of the rotor blade arms at 45 degrees inclined outwardly away from the fuselage.

10. The UAV as claimed in claim 7, wherein the rudders include ruddervators for maneuvering the UAV for yaw and a secondary roll response.

11. The UAV as claimed in claim 1, wherein the UAV further includes at least two landing gears attached to each end of the central frame.

12. The UAV as claimed in claim 11, wherein each of the at least two landing gears includes a landing gear mount fixed to the central frame; a right landing gear; and a left landing gear; wherein the right landing gear and the left landing gear are removably fitted to the landing gear mount through snap-fit locking mechanisms.

\* \* \* \* \*